United States Patent [19]
Yun

[11] Patent Number: 5,420,471
[45] Date of Patent: May 30, 1995

[54] ELECTRIC GENERATOR UTILIZING MINIMAL MECHANICAL POWER

[76] Inventor: Ja D. Yun, 2/6, 186-114, Huksuk-Dong, Dongjak-ku, Seoul, Rep. of Korea

[21] Appl. No.: 135,355

[22] Filed: Oct. 13, 1993

[30] Foreign Application Priority Data

Oct. 14, 1992 [KR] Rep. of Korea .................... 92-19775

[51] Int. Cl.6 ......................... H02K 1/06; H02K 1/12
[52] U.S. Cl. .................................. 310/216; 310/254; 310/191; 310/192
[58] Field of Search ................ 310/216, 254, 192, 191

[56] References Cited

U.S. PATENT DOCUMENTS

| | | | |
|---|---|---|---|
| 2,456,982 | 12/1948 | Moore | 310/216 |
| 3,671,787 | 6/1972 | Herron | 310/254 |
| 4,249,099 | 2/1981 | Bhongbhibhat et al. | 310/259 |
| 4,255,684 | 3/1981 | Mischler et al. | 310/216 |
| 5,091,666 | 2/1992 | Jarczsynski | 310/64 |

FOREIGN PATENT DOCUMENTS

| | | | |
|---|---|---|---|
| 2307448 | 8/1974 | Germany | 310/216 |
| 287993 | 5/1953 | Switzerland | 310/216 |
| 665364 | 5/1979 | U.S.S.R. | 310/216 |

*Primary Examiner*—Steven L. Stephan
*Assistant Examiner*—Clayton E. LaBalle
*Attorney, Agent, or Firm*—Jacobson, Price, Holman & Stern

[57] ABSTRACT

An electric generator which can be powered using a minimal amount of mechanical power, and in particular, an electric generator having a weak electromagnet which acts as a stator core, thus enabling electric power generation to occur while only minimal amounts of mechanical power are utilized. The generator comprises two annular ferromagnetic silicon steel plates inserted between non-magnetic plates to thus define a stator core with a stacked silicon steel plate and non-magnetic plate arrangement. The internal diameter of the ferromagnetic silicon steel plates is preferably at least 5 millimeters larger than that of the non-magnetic plates. Consequently, a strong magnetic field cannot be formed around the stator core, and as a result, the generator's rotor can be rotated using minimal amounts of mechanical power.

5 Claims, 1 Drawing Sheet

ELECTRIC GENERATOR UTILIZING MINIMAL MECHANICAL POWER

The present invention relates to an electric generator which can be powered using a minimal amount of mechanical power, and in particular, relates to an electric generator having a weak electromagnet which acts as a stator core, thus enabling electric power generation to occur while only minimal amounts of mechanical power are utilized.

BACKGROUND OF THE INVENTION

In conventional generators which use silicon steel plates as a stator core (or stator), very strong magnetic fields are generated by the stator coil (or stator winding), and consequently a large amount of mechanical power is required to rotate a rotor and to thus generate electric power.

SUMMARY OF THE INVENTION

A primary object of the present invention is to overcome the foregoing problem by providing an electric generator capable of generating electric power while utilizing minimal amounts of mechanical power.

To achieve this and other objects, the generator of the present invention comprises two annular ferromagnetic silicon steel plates inserted between non-magnetic plates to thus define a stator core with a stacked silicon steel plate and non-magnetic plate arrangement. The internal diameter of the ferromagnetic silicon steel plates is preferably at least 5 millimeters larger than that of the non-magnetic plates. Consequently, a strong magnetic field cannot be formed around the stator core of the present invention, and as a result, the generator's rotor can be rotated using minimal amounts of mechanical power. Preferably, the non-magnetic plates are comprised of aluminum.

The above and other objects and advantages will become more readily apparent when reference is made to the following description taken in conjunction with the accompanying drawings.

DETAILED DESCRIPTION OF A PREFERRED EMBODIMENT

Figure 1:
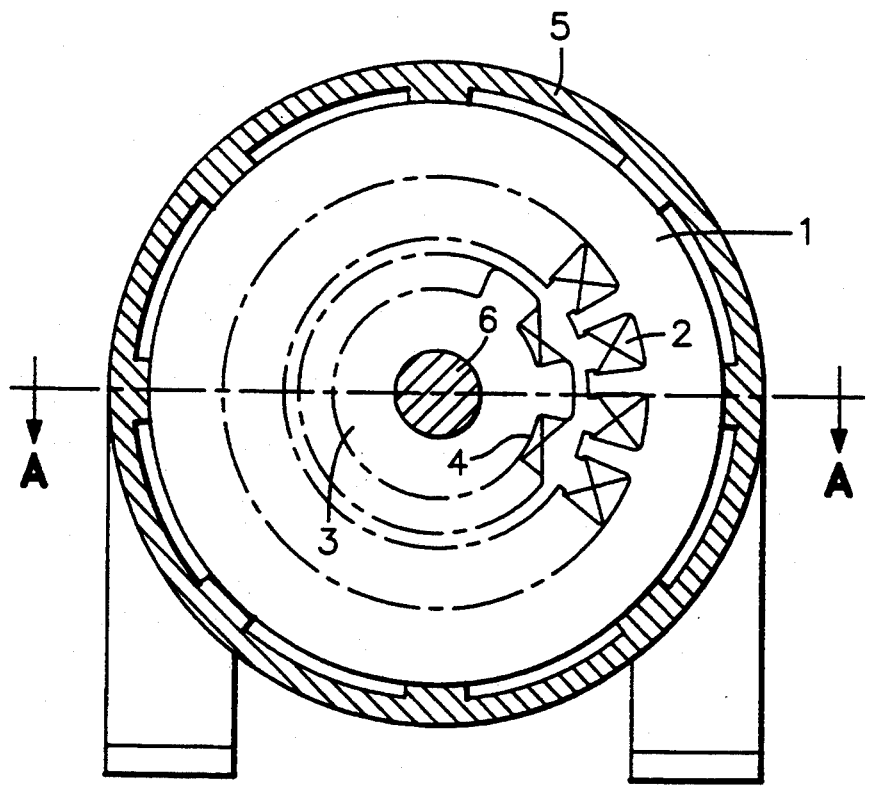
FIG. 1 is a sectional view illustrating a preferred embodiment of an electric generator according to the present invention.
Figure 2:
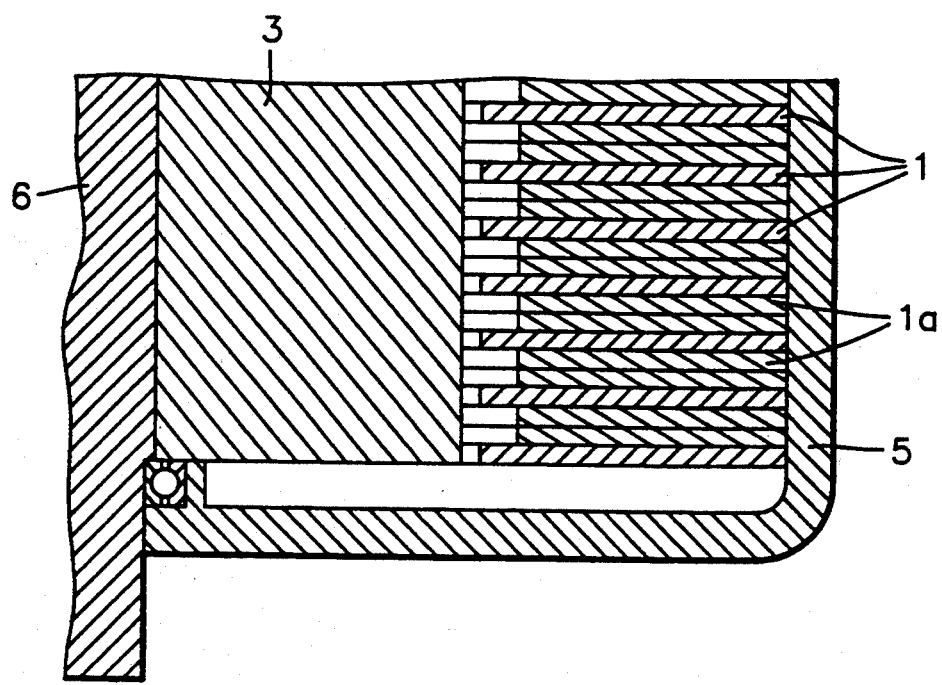
FIG. 2 is a magnified sectional view of the preferred embodiment shown in FIG. 1, taken along line A—A.

A preferred embodiment of the present invention will now be described with reference to FIGS. 1 and 2.

A generator according to the preferred embodiment comprises a generally cylindrical body 5; a stator core comprising a substantially annular aluminum plates 1 and a two substantially annular silicon steel plates 1a stacked together in a repeating manner; a rotor 3 rotatably mounted within the stator core and having a rotor coil 4; and a shaft 6 connected to the rotor 3 and extending out from the generator. A stator coil winding 2 is provided around each of the silicon steel plates 1a. Preferably, the internal diameter of each silicon steel plate 1a is at least five millimeters larger than that of the aluminum plates 1.

By using the foregoing inserted silicon steel plate arrangement, there is a decrease in the magnetic flux of the magnetic field opposing the rotation of the rotor. Since this magnetic field is only weakly formed around the outside of the cylindrical surface of the rotor 3, the forces which restrain the rotation of the rotor are minimized and the generator thus can be driven while using a minimal amount of mechanical power. In addition, the magnetic flux derived from such a field core is effective at generating an electric motive force in the stator coil 2 equal to that of a conventional generator.

I claim:

1. A stator core for minimizing the amount of mechanical power required to drive an electric generator; said stator core comprising:
    at least two substantially annular non-magnetic plates; and
    two substantially annular silicon steel plates disposed coaxially between each of said at least two non-magnetic plates, wherein said two substantially annular silicon steel plates have an internal diameter which is at least five millimeters larger than that of said at least two substantially annular non-magnetic plates.

2. The stator core of claim 1, wherein said at least two substantially annular non-magnetic plates are comprised of aluminum.

3. A generator which can be driven using a minimal amount of mechanical power, said generator comprising:
    a rotatably mounted rotor having at least one rotor coil mounted thereto; and
    a substantially annular stator core comprising at least two substantially annular non-magnetic plates and two substantially annular silicon steel plates disposed coaxially between each of said at least two non-magnetic plates, wherein said two substantially annular silicon steel plates have an internal diameter which is at least five millimeters larger than that of said at least two substantially annular non-magnetic plates.

4. The generator of claim 3, wherein said at least two substantially annular non-magnetic plates are comprised of aluminum.

5. The generator of claim 3, further comprising a generally cylindrical housing disposed around said substantially annular stator core.

* * * * *